United States Patent [19]

King

[11] Patent Number: 4,897,202

[45] Date of Patent: Jan. 30, 1990

[54] PROCESS AND APPARATUS FOR RECOVERY AND RECYCLING CONVEYOR LUBRICANTS

[75] Inventor: William J. King, Orange, Calif.

[73] Assignee: Pure-Chem Products, Inc., Stanton, Calif.

[21] Appl. No.: 148,288

[22] Filed: Jan. 25, 1988

[51] Int. Cl.$^4$ .................. C02F 1/00; B65G 45/00
[52] U.S. Cl. .................. 210/754; 210/758; 210/764; 210/765; 210/167; 210/199; 210/203; 198/495; 198/500; 134/10; 134/21; 134/109
[58] Field of Search ............... 210/167, 168, 199, 765, 210/805, 806, 764, 203; 134/10, 21, 28, 64 R, 104, 111, 169 R, 108, 110, 124, 131; 198/500, 495; 15/306 A, 306 R

[56] References Cited

U.S. PATENT DOCUMENTS

| | | | |
|---|---|---|---|
| 579,385 | 3/1897 | Dodge | 184/15.1 |
| 883,536 | 3/1908 | Gessner | 34/82 |
| 1,014,248 | 1/1912 | Mueller | 184/15.1 |
| 1,196,438 | 8/1916 | Doyle et al. | 101/425 |
| 1,245,605 | 11/1917 | Lucas | 210/758 |
| 1,560,286 | 11/1925 | Mount | 55/42 |
| 1,926,306 | 9/1933 | Pettersen | 15/306 A |
| 1,954,800 | 4/1934 | Palmerton et al. | 162/161 |
| 2,003,397 | 6/1935 | Smith | 15/306 A |
| 2,082,411 | 6/1937 | Merrill | 15/306 A |
| 2,095,471 | 10/1937 | Hayward | 34/160 |
| 2,103,966 | 12/1937 | Behan | 68/18 F |
| 2,142,711 | 1/1939 | Birch | 15/306 A |
| 2,234,153 | 3/1941 | Herbert | 72/39 |
| 2,245,109 | 6/1941 | Lapeyrouse | 162/247 |
| 2,367,354 | 1/1945 | Kanter | 198/500 |
| 2,495,937 | 1/1950 | Lawlor | 210/758 |
| 2,532,910 | 12/1950 | Hayward | 34/68 |
| 2,541,301 | 2/1951 | Sissler | 15/256.5 |
| 2,548,739 | 4/1951 | Peck | 198/500 |
| 2,597,801 | 5/1952 | Jellinek | 15/306 A |
| 2,604,199 | 7/1952 | Govan | 184/17 |
| 2,668,796 | 2/1954 | Wehmiller et al. | 210/785 |
| 2,670,069 | 2/1954 | Dobkin | 184/17 |
| 2,677,197 | 5/1954 | Lindgren | 34/115 |
| 2,719,529 | 10/1955 | Wells | 134/144 |
| 2,788,540 | 4/1957 | Snape | 15/306 A |
| 2,859,537 | 11/1958 | Shockey | 34/85 |
| 2,872,415 | 2/1959 | Schleyer et al. | 210/750 |
| 2,875,846 | 3/1959 | Yonkers | 55/290 |
| 2,885,068 | 5/1959 | Bishop | 198/495 |
| 2,885,069 | 5/1959 | Bowen | 198/494 |
| 2,893,043 | 7/1959 | Charlton et al. | 15/306 A |
| 2,901,394 | 8/1959 | Wilmington | 514/568 |
| 2,908,355 | 10/1959 | Moore | 184/15.1 |
| 2,956,300 | 10/1960 | Bruno | 15/306 A |
| 2,956,301 | 10/1960 | Bruno | 15/306 A |
| 3,023,848 | 3/1962 | Osterman | 184/15.1 |
| 3,045,273 | 7/1962 | Bruno | 15/306 A |
| 3,053,371 | 9/1962 | Fischer | 198/500 |
| 3,060,482 | 10/1962 | Doyle | 15/306 A |
| 3,067,837 | 12/1962 | Burrows | 184/15.1 |
| 3,079,285 | 2/1963 | Rockwell | 134/10 |
| 3,082,146 | 3/1963 | Wentworth et al. | 162/161 |
| 3,103,030 | 9/1963 | Sands | 15/306 A |
| 3,113,351 | 12/1963 | Naegeli | 19/263 |
| 3,119,140 | 1/1964 | Sallet | 15/306 A |
| 3,145,409 | 8/1964 | Davey et al. | 15/306 A |
| 3,151,064 | 9/1964 | Lathrop | 210/758 |
| 3,170,314 | 2/1965 | Worst | 68/12 R |
| 3,192,155 | 6/1965 | Bready et al. | 210/705 |
| 3,252,177 | 5/1965 | Alexeff | 15/306 A |
| 3,264,173 | 8/1966 | Frick | 162/274 |
| 3,267,970 | 8/1966 | Maguire et al. | 139/1 C |
| 3,272,651 | 9/1966 | Quirk | 134/21 |
| 3,295,339 | 1/1967 | Cheyne | 68/18 F |
| 3,298,904 | 1/1967 | Compte et al. | 162/274 |
| 3,328,294 | 6/1967 | Self et al. | 210/744 |
| 3,358,315 | 12/1967 | Bennett | 15/306 R |
| 3,420,654 | 1/1969 | Cannon et al. | 71/67 |

(List continued on next page.)

Primary Examiner—W. Gary Jones
Assistant Examiner—Matthew O. Savage
Attorney, Agent, or Firm—Jackson & Jones

[57] ABSTRACT

A solution of water soluble conveyor lubricant is continuously recovered from a moving conveyor through a suction bar. The lubricant is treated with a bactericide and the pH is adjusted as needed. The solution is then recycled at least once to obtain about a 50%–90% recovery.

35 Claims, 1 Drawing Sheet

U.S. PATENT DOCUMENTS

| | | | |
|---|---|---|---|
| 3,453,681 | 7/1969 | Wiederhold | 15/306 A |
| 3,462,363 | 8/1969 | Mills | 210/668 |
| 3,469,275 | 9/1969 | Deschutters et al. | 15/306 R |
| 3,510,433 | 5/1970 | Pasowicz | 252/180 |
| 3,514,278 | 5/1970 | Brink | 71/67 |
| 3,546,114 | 12/1970 | Dietz et al. | 210/760 |
| 3,554,323 | 1/1971 | Wheelock | 184/15.1 |
| 3,568,238 | 3/1971 | Fischer | 15/306 B |
| 3,574,261 | 4/1971 | Bailey | 34/23 |
| 3,576,234 | 4/1971 | Batchelor | 184/15.1 |
| 3,618,713 | 11/1971 | Batchelor | 184/15.1 |
| 3,647,703 | 3/1972 | Shema et al. | 252/180 |
| 3,654,659 | 4/1972 | Blumenthal | 15/306 A |
| 3,659,096 | 4/1972 | Kompanek | 422/24 |
| 3,664,821 | 5/1972 | Shema et al. | 71/67 |
| 3,690,860 | 9/1972 | Salutsky et al. | 71/67 |
| 3,739,605 | 6/1973 | Baker | 68/20 |
| 3,751,756 | 8/1973 | Arnett, Jr. | 15/306 A |
| 3,775,806 | 12/1973 | Olbrant et al. | 15/306 A |
| 3,837,800 | 9/1974 | Wood | 422/24 |
| 3,841,910 | 10/1974 | Baker | 134/15 |
| 3,848,290 | 11/1974 | Bates | 15/321 |
| 3,859,163 | 1/1975 | Haythorn | 162/198 |
| 3,871,982 | 3/1975 | Idstein | 204/207 |
| 3,882,568 | 5/1975 | Hill | 15/308 |
| 3,885,272 | 5/1975 | Marzoli | 19/245 |
| 3,897,562 | 7/1975 | Shema et al. | 514/528 |
| 3,909,873 | 10/1975 | Minasov et al. | 15/306 B |
| 3,915,857 | 10/1975 | Olson | 210/668 |
| 3,919,729 | 11/1975 | Cannan | 8/58 |
| 3,956,790 | 5/1976 | Ishiwata et al. | 15/302 |
| 3,959,843 | 6/1976 | Yokota et al. | 15/306 A |
| 3,962,456 | 6/1976 | Swered et al. | 514/640 |
| 3,973,987 | 8/1976 | Hewitt et al. | 134/12 |
| 3,974,540 | 8/1976 | Bonner | 15/306 A |
| 3,974,541 | 8/1976 | Silvis et al. | 15/320 |
| 4,010,514 | 3/1977 | Fischer et al. | 15/306 A |
| 4,011,623 | 3/1977 | Pabst et al. | 15/306 A |
| 4,014,065 | 3/1977 | Hudson | 15/306 R |
| 4,026,701 | 5/1977 | Till et al. | 430/125 |
| 4,116,762 | 9/1978 | Gardiner | 162/199 |
| 4,159,579 | 7/1979 | Hoddinott et al. | 34/155 |
| 4,166,368 | 9/1979 | Beninca et al. | 68/20 |
| 4,189,046 | 2/1980 | Ward et al. | 198/499 |
| 4,202,437 | 5/1980 | Gordon | 198/497 |
| 4,208,283 | 6/1980 | Brouzes | 210/754 |
| 4,225,431 | 9/1980 | De Longe | 210/617 |
| 4,231,133 | 11/1980 | Probost | 15/300 A |
| 4,251,895 | 2/1981 | Caridis | 15/3.13 |
| 4,261,760 | 4/1981 | Kandel | 134/15 |
| 4,262,776 | 4/1981 | Wilson et al. | 184/15.1 |
| 4,274,973 | 6/1981 | Stanton et al. | 252/34.7 |
| 4,277,343 | 7/1981 | Paz | 210/614 |
| 4,278,497 | 7/1981 | Mellen | 162/252 |
| 4,280,869 | 7/1981 | Eckerdt | 162/252 |
| 4,290,520 | 9/1981 | Rhodes | 198/499 |
| 4,308,077 | 12/1981 | Bolton | 134/15 |
| 4,314,906 | 2/1982 | Dunn et al. | 210/754 |
| 4,324,327 | 4/1982 | Chouteau | 198/497 |
| 4,329,201 | 5/1982 | Bolton | 162/198 |
| 4,337,269 | 6/1982 | Berke et al. | 514/494 |
| 4,359,150 | 11/1982 | Bowman et al. | 198/497 |
| 4,441,340 | 4/1984 | Kaplan | 68/12 R |
| 4,447,924 | 5/1984 | Bolteon et al. | 8/151 |
| 4,450,080 | 5/1984 | Dodd | 210/391 |
| 4,454,621 | 6/1984 | Testone | 15/1.5 R |
| 4,455,706 | 6/1984 | Volkmann et al. | 15/306 A |
| 4,477,287 | 10/1984 | Kush et al. | 134/15 |
| 4,489,823 | 12/1984 | Gordon | 198/499 |
| 4,498,577 | 2/1985 | Veenhof | 198/499 |
| 4,520,528 | 6/1985 | Grof | 15/304 |
| 4,522,488 | 6/1985 | Fisher | 355/15 |
| 4,533,035 | 8/1985 | Reiter | 198/499 |
| 4,590,646 | 5/1986 | Gasser | 19/262 |
| 4,594,767 | 6/1986 | Warvinge | 15/308 |
| 4,616,377 | 10/1986 | Urbani | 15/302 |
| 4,633,999 | 1/1987 | Perneczky | 198/499 |
| 4,672,711 | 6/1987 | Mickler | 8/151 |
| 4,724,079 | 2/1988 | Sale et al. | 210/638 |
| 4,727,614 | 3/1988 | Swistun | 15/1.5 R |
| 4,733,526 | 9/1988 | Slikker | 60/39.02 |
| 4,768,644 | 9/1988 | Cromm | 198/499 |
| 4,779,716 | 10/1988 | Gordon | 198/497 |
| 4,783,947 | 11/1988 | Posey et al. | 53/167 |
| 4,787,500 | 11/1988 | Holz | 198/497 |

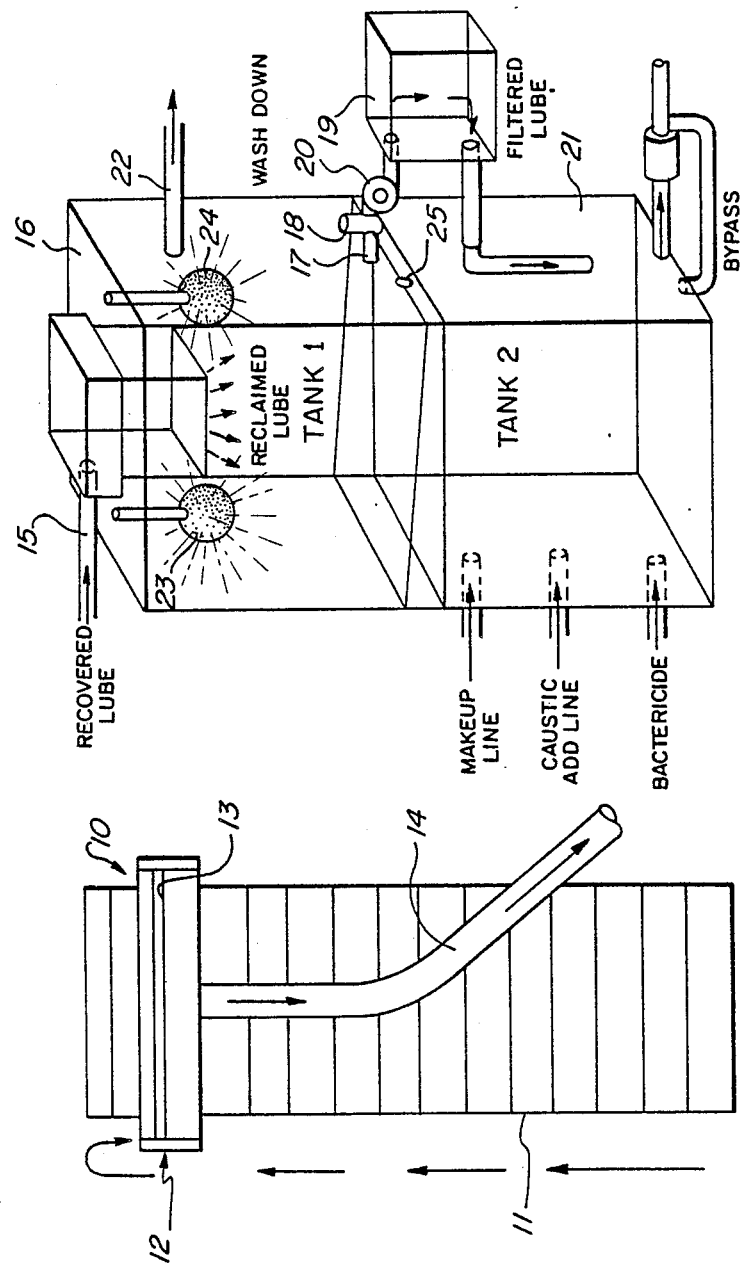

PROCESS AND APPARATUS FOR RECOVERY AND RECYCLING CONVEYOR LUBRICANTS

BACKGROUND OF THE INVENTION

This invention relates to a new and improved process and apparatus for recovering, treating and recycling a solution of water soluble conveyor chain lubricating soap and/or detergent from conveyor lines. The invention is suitable for use in bottling plants such as those in the soft drink, beverage and beer industries, in food canning plants, and in the dairy industry.

Presently, these type of plants employ a solution of soap a single time only, and then discharge the soap solution to a sewage line. This process not only consumes water, which is obviously in short supply, and hence expensive, but it also taxes the capacity of existing sewage systems. Consequently, many bottlers now pay very large sewer tax fees, based on effluent content, for sewer line use. In addition, the solution of soap and foam which is discharged onto the work floor is slippery and presents a worker hazard, and also, the soap may eventually erode the floor itself. Typically, a large bottling facility may use 5,000–10,000 gallons of water per day and say, about 75 gallons of soap.

Obviously, a recovery process and system is desired which will reduce the use of both water and soap, and also reduce or eliminate the generation of foam. Sewage use also will be reduced.

Preferably, the process and system should be simple and inexpensive, and easy to install, operate and service.

THE INVENTION

According to the invention, a recovery process and system are provided for continuously collecting and recycling a solution of water soluble, chain lubricating soaps and/or detergents from a conveyor line while defoaming the solution.

Prior to recycling, or during the recycling operation, the soap solution is treated to maintain its function, after which the solution is recycled to the conveyor line.

Typically, a suction means operated by a vacuum, pump, venturi, etc., is positioned on the underside of the conveyor line to remove the relatively thin film of water solution of soap and/or detergent from the conveyor and simultaneously defoam the solution.

The solution is then fed to treating tanks for pH adjustment with caustic, bactericide treatment, and then recycled to the conveyor line for reuse. After a period of reuse, i.e., when the solution becomes dirty, it is chlorinated, filtered and then discharged to sewage, and a fresh batch of soap solution is added. It is estimated that a 50%–90% recovery can be obtained by the process and system of this invention. Thus, for a normal 10,000 gallon of effluent discharge/day, a 90% recovery would obtain a 365,000 gallon/year effluent discharge compared to the usual 3,650,000 gallon/year of effluent discharge. A 50% recovery would obtain a 1,825,000 gallon/year effluent discharge. In both cases, a considerable saving could be realized in water costs, soap costs, sewer charges, and would reduce the problems due to foam. It would also facilitate treatment of effluent to reduce the levels of biological oxygen demand in sewage.

BRIEF DESCRIPTION OF THE DRAWINGS

FIG. 1 is a diagrammatic bottom plan view of the apparatus of this invention showing the suction means for removing and defoaming soap solution from a conveyor; and, FIG. 2 is a schematic, perspective view showing the treating and recycling portion of the apparatus.

DESCRIPTION OF THE PREFERRED EMBODIMENTS

The recovery apparatus 10 of this invention is shown in FIG. 1 mounted on a moving conveyor 11 which has been sprayed with a water soluble lubricating soap and/or detergent, such as a potassium-tall oil soap. The recovery apparatus is usually mounted under the conveyor and transversely to the direction of the conveyor movement. Preferably, the recovery unit is positioned at or near the dump side of the conveyor, i.e., just after the conveyor changes direction from the upper to the lower side.

The recovery apparatus includes a suction bar 12 defining a suction slit 13 and powered by a suction means (not shown) such as a vacuum, pump, venturi, etc., through a suction line 14, and then to a recovery and treating unit, which will be described, infra.

Typically, the liquid portion of the film containing soap on the conveyor is about $1/20\Delta$–$\frac{1}{2}\Delta$ thick, and may vary from 1 mil–500 mils. Usually, the film is about $1/20\Delta$–$1/5\Delta$ thick. Typically, about 50–200 parts of water to 1 part by weight of soap are used, and defoaming is easily accomplished. A water/soap ratio varying from a 1:1 water content in soap concentrate to about a water/soap ratio of about 2000:1 is estimated to be useful.

As shown in FIG. 2, the solution of recovered soap is fed to the inlet line 15 of a recovery tank 16. Underflow from the recovery tank is pumped into an outlet line 17 through a filter 18, and then to a holding tank 19 by a pump 20. Filtered soap solution from the holding tank 19 is then pumped to a treating a recycle tank 21 positioned under the recovery tank where the solution pH is adjusted with caustic (e.g. NaOH or KOH). Bactericides are also added, and make-up soap solution is added if necessary. If additional defoaming is required, isopropyl alcohol may be employed, and is added to the foam in the recovery tank; the isopropyl alcohol can be removed by heating at about 80° C., and recovered. Other defoaming agents, such as food grade defoamers, are also suitable. The treated soap solution is then recycled to the conveyor line for reuse, the entire process being adapted for continuous operation.

When the water solution of soap and/or detergent becomes too dirty, it is fed from the recovery tank 16 through an outlet line 22 to a chlorination unit (to reduce the BOD level), and it is then filtered, using say sand, diatomaceous earth, a filter cartridge, etc., and then discharged to a sewage line. Spray elements 23, 24 are used to wash the interior of the recovery tank 16. A dump valve 25 is provided to drain the tank 16 if the solution becomes excessively contaminated, thereby rendering subsequent treatment ineffective.

EXAMPLE

The device of this invention was installed on a conveyor line of the Coca Cola bottling plant in Downey, California, one of the world's largest facility for this products. This particular plant has five conveyor lines and bottles 44,000,000 cases per year @ 24 cans per case. About 7,500–10,000 gallons of soap solution are discharged daily from the conveyor lines to sewage, and this incurs a sewage use fee of about $750,000/year.

The suction bar 12 shown in FIG. 1 defines a suction slit 13 about ⅛Δ wide and about 24Δ long, to accommodate the same width of conveyor 11. A soap solution of 125 parts by weight of water containing one part by weight of a water soluble, potassium-tall oil soap was sprayed onto the stainless steel conveyor in the normal manner, and this formed a liquid film in the order of 1/10Δ on the conveyor, in addition to foam.

A 3½ H. P. Dayton type, wet and dry vacuum was used to remove the liquid from the underside of the conveyor without having any of the solution contact the floor. The solution was fed to a container through the suction line 14, with dimensions of about 1½Δ in diameter and about 2 feet in length. The operating temperature at the test site was about 60°–65° F. Sufficient suction force was applied to completely break the foam, and the soap solution was returned to the soap sprayers on the conveyors and reused in the normal course of operations, without any visible sign of deterioration.

It will be appreciated that other types of suction inlet configurations may be used besides a single slit. For example, a series of round perforations, or small longitudinal slits, etc., are suitable. Also, it may be feasible to collect a film of the soap solution in a small drip tank positioned under the conveyor 11 and employ a suction element having a single round suction inlet to remove and defoam the soap solution.

In addition, other soaps and detergents may be employed in this invention, and include synthetic detergents derived from sulfonates, phosphate esters, amides and phosphonates; metal soaps, non-ionic, cationic and anionic surfactant systems; Na and K-vegetable soaps, tall oil soaps, fatty acid soaps, etc. The soaps may be used alone or in combination with each other, where feasible.

The process and apparatus of this invention quickly defoams and removes the soap solution before it contacts the floor, and hence it can be reused in a sanitary fashion; also, the workplace is less hazardous. In addition, there is far less water consumption, and hence less sewer fees are necessary. The process of this invention enables the effluent product to be treated, thereby reducing the biological oxygen demand by treatment with $Cl_2$, $O_2$, air, or a combination thereof.

I claim:

1. A process for recovering and recycling a solution of water soluble conveyor lubricant or detergent from a moving conveyor, comprising the steps of:
   (a) continuously recovering of the lubricant or detergent from the conveyor by suction means;
   (b) treating the recovered lubricant or detergent which is to be reused so as to render the recovered lubricant or detergent suitable for reuse; and
   (c) recycling the treated lubricant or detergent to a conveyor lubricating system.

2. The process of claim 1 in which the recovered lubricant or detergent is filtered, adjusted for pH, treated with a bactericide, adjusted for lost material as needed by adding make-up lubricant or detergent and recycled back to the conveyor.

3. The process of claim 1 wherein the recovered lubricant or detergent which is unsuitable for reuse is fed to a chlorination or oxygenation unit to reduce BOD levels and then discharged out of the process.

4. The process of claim 1, wherein the lubricant or detergent is present on the conveyor as a film having a thickness of about 1 mil–about 500 mils.

5. The process of claim 4, wherein the film has a thickness of about 1/20 inches–about ½ inches.

6. The process of claim 1, further comprising the step of defoaming the recovered lubricant or detergent prior to treatment of the recovered lubricant or detergent for reuse.

7. The process of claim 1, wherein the suction means is positioned proximate the dump side of the conveyor.

8. The process of claim 1, wherein the lubricant or detergent is an aqueous soap solution.

9. The process of claim 8, wherein the ratio of water/soap in the recovered lubricant or detergent is about 1:1 to about 2000:1.

10. The process of claim 9, wherein the water/soap weight ratio is about 50:1 to about 200:1.

11. A process comprising a step of recovering foaming conveyor lubricant from a moving conveyor by suction means.

12. The process of claim 11 wherein the conveyor lubricant is present on the conveyor as a film.

13. The process of claim 11 wherein the conveyor is constructed of metal.

14. The process of claim 13 wherein the metal is stainless steel.

15. The process of claim 11 wherein the conveyor is a chain.

16. The process of claim 11 further comprising the step of recycling the recovered lubricant.

17. The process of claim 11 wherein the conveyor lubricant is a soap based aqueous lubricant having foam forming characteristics.

18. The process of claim 17 wherein the suction means is a suction bar configured substantially transverse to the direction in which the conveyor moves.

19. The process of claim 18 wherein the conveyor has a conveying portion and a return portion and the suction is proximate the point at which the conveyor changes form conveying to returning.

20. An apparatus for recovering and recycling conveyor lubricant or detergent from a moving conveyor, comprising:
   (a) suction means for continuously recovering the lubricant or detergent from the conveyor;
   (b) means to treat the recovered lubricant or detergent so as to render the recovered lubricant or detergent suitable for reuse; and
   (c) means to recycle the treated lubricant or detergent to a conveyor lubricating system.

21. The apparatus of claim 20 wherein the treatment means comprises a filter means for filtering the recovered solution, pH adjustment means, bactericide treatment means and means for adding make-up lubricant or detergent.

22. The apparatus of claim 20, further including a defoaming means for defoaming the recovered lubricant or detergent prior to treatment of the recovered lubricant or detergent for reuse.

23. The apparatus of claim 20, wherein the suction means comprises a slit suction device.

24. The apparatus of claim 20, wherein the suction means is positioned proximate the dump side of the conveyor.

25. The apparatus of claim 20 wherein the defoaming means treats the recovered lubricant or detergent with a chemical defoaming agent.

26. The apparatus of claim 20, wherein the apparatus is capable of recovering lubricant or detergent which is present on the conveyor as a film having a thickness of about 1 mil–about 500 mils.

27. The apparatus of claim 26, wherein the film has a thickness of about 1/20 inches–about ½ inches.

28. The apparatus of claim 20, wherein the apparatus is capable of recovering an aqueous soap solution from a moving conveyor when the ratio of water/soap in the recovered aqueous soap solution is about 1:1 to about 2000:1.

29. The apparatus of claim 26, wherein the water/soap ratio is about 50:1 to about 200:1.

30. An apparatus comprising:
(a) a continuous conveyor, and
(b) a suction means for removing a film of foaming conveyor lubricant from the conveyor while the conveyor is moving.

31. The apparatus of claim 30 wherein the suction means is a suction bar configured substantially transverse to the direction in which the conveyor moves.

32. The apparatus of claim 30 wherein the conveyor has a conveying portion and a return portion and a suction bar is proximate the point at which the conveyor switches from conveying to returning.

33. The apparatus of claim 30 wherein the conveyor is constructed of a metal.

34. The apparatus of claim 30 wherein the metal is stainless steel.

35. The apparatus of claim 30 further comprising a means for recycling the recovered lubricant.

* * * * *